United States Patent
Hunt et al.

(10) Patent No.: US 11,868,460 B2
(45) Date of Patent: Jan. 9, 2024

(54) AUTHORIZED ENCRYPTION

(71) Applicant: International Business Machines Corporation, Armonk, NY (US)

(72) Inventors: Guerney D. H. Hunt, Yorktown Heights, NY (US); Steven Robert Hetzler, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 17/193,905

(22) Filed: Mar. 5, 2021

(65) Prior Publication Data

US 2022/0284087 A1    Sep. 8, 2022

(51) Int. Cl.
*G06F 21/44*    (2013.01)
*G06F 21/60*    (2013.01)
*H04L 9/08*    (2006.01)
*H04L 9/32*    (2006.01)

(52) U.S. Cl.
CPC ............ *G06F 21/44* (2013.01); *G06F 21/602* (2013.01); *H04L 9/088* (2013.01); *H04L 9/3242* (2013.01)

(58) Field of Classification Search
CPC ....... G06F 21/44; G06F 21/602; H04L 9/088; H04L 9/3242
See application file for complete search history.

(56) References Cited

U.S. PATENT DOCUMENTS

| | | | |
|---|---|---|---|
| 9,584,437 B2 | 2/2017 | Marshall et al. | |
| 9,607,131 B2 | 3/2017 | Winograd et al. | |
| 10,020,935 B1 | 7/2018 | Ghetti et al. | |
| 10,476,907 B2 | 11/2019 | Hittel et al. | |
| 10,705,923 B2 | 7/2020 | Resch et al. | |
| 10,764,254 B2 | 9/2020 | Ford et al. | |

(Continued)

FOREIGN PATENT DOCUMENTS

WO    2005091547 A3    10/2005

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

(Continued)

*Primary Examiner* — Ayoub Alata
(74) *Attorney, Agent, or Firm* — Zilka-Kotab, P.C.

(57) ABSTRACT

A computer program product includes one or more computer readable storage media, and program instructions collectively stored on the one or more computer readable storage media, the program instructions include program instructions to authenticate an application as authorized to perform encryption and program instructions to receive data at an authenticated encryption layer. The program instructions include program instructions to encrypt the data using an encryption key, wherein the encryption key is not available to the application, and program instructions to generate a watermark token of the encrypted data. The program instructions include program instructions to generate a watermark of the encrypted data using the watermark token and a watermark key and program instructions to send the encrypted data, the watermark token, and the watermark to a storage system. The storage system is configured to verify the encrypted data for storage using the watermark key.

25 Claims, 6 Drawing Sheets

(56) References Cited

U.S. PATENT DOCUMENTS

| | | |
|---|---|---|
| 10,846,377 B2 | 11/2020 | Goyal |
| 2012/0072731 A1* | 3/2012 | Winograd ................ G09C 5/00 |
| | | 713/176 |
| 2016/0253772 A1* | 9/2016 | Kofod ................... G06T 1/0021 |
| | | 382/100 |
| 2018/0241728 A1 | 8/2018 | Burgess et al. |
| 2019/0149328 A1 | 5/2019 | Van Der Velden |
| 2019/0220578 A1* | 7/2019 | Pogorelik ............. G06T 1/0021 |
| 2019/0238317 A1* | 8/2019 | Nazarian ............... G06F 21/602 |
| 2019/0294761 A1* | 9/2019 | Kim ...................... H04L 9/3239 |
| 2021/0027414 A1* | 1/2021 | Dewitt ................. G06T 1/0035 |
| 2021/0056223 A1 | 2/2021 | Hetzler |

OTHER PUBLICATIONS

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

International Search Report and Written Opinion from PCT Application No. PCT/EP2022/053949, dated May 27, 2022.

* cited by examiner

AUTHORIZED ENCRYPTION

BACKGROUND

The present invention relates to encryption, and more particularly, this invention relates to authorized encryption in cloud storage systems and networks.

Unauthorized encryption of data, such as by an attacker encrypting a victim's data with a key unknown to the victim, is a major security issue. Such ransomware-type attacks create a denial of service for the victim, which can be expensive or impossible to recover from. For example, such attacks include ransomware attacks, where a ransom is demanded in exchange for the encryption key needed to unlock the victim's data.

Malware may also and/or alternatively carry out unauthorized data transfer (e.g., data is copied, transferred, retrieved, etc.) without authorization in exfiltration-type attacks.

What is needed is a way to ensure that encrypted data in a system has been encrypted in an authorized manner such that the data owner is able to decrypt the data.

BRIEF SUMMARY

An authorized encryption scheme according to one aspect of the present invention may verify that encryption was performed by an authorized encryption layer and not an unauthorized process. Ransomware-type attacks would thereby be beneficially blocked. Exfiltration-type attacks would also be highly restricted by requiring data to be encrypted using authorized encryption by authenticated and/or attested applications which are allowed to use the authorized encryption.

A computer program product, according to one approach, includes one or more computer readable storage media, and program instructions collectively stored on the one or more computer readable storage media, the program instructions include program instructions to authenticate an application as authorized to perform encryption and program instructions to receive data at an authenticated encryption layer. The program instructions include program instructions to encrypt the data using an encryption key, wherein the encryption key is not available to the application, and program instructions to generate a watermark token of the encrypted data. The program instructions include program instructions to generate a watermark of the encrypted data using the watermark token and a watermark key and program instructions to send the encrypted data, the watermark token, and the watermark to a storage system. The storage system is configured to verify the encrypted data for storage using the watermark key. The computer program product beneficially provides the ability to verify that encryption was performed by an authorized encryption layer and not an unauthorized process.

The computer program product optionally includes program instruction to, prior to the encryption, determine, by a prefilter function, whether the data is pre-encrypted in an unknown encryption key and program instruction to, in response to determining that the data is pre-encrypted, block the data from encryption using the encryption key. This optional approach provides an additional layer of security against ransomware-type attacks.

A computer-implemented method, according to one approach, includes authenticating an application as authorized to perform encryption, receiving data at an authenticated encryption layer, encrypting the data using an encryption key, wherein the encryption key is not available to the application, generating a watermark token of the encrypted data, generating a watermark of the encrypted data using the watermark token and a watermark key and sending the encrypted data, the watermark token, and the watermark to a storage system. The storage system is configured to verify the encrypted data for storage using the watermark key. The computer-implemented method beneficially provides the ability to verify that encryption was performed by an authorized encryption layer and not an unauthorized process.

A computer program product, according to another approach, includes one or more computer readable storage media, and program instructions collectively stored on the one or more computer readable storage media, the program instructions include program instructions to receive encrypted data, a watermark token, metadata, and a first watermark of the encrypted data at a storage system and program instructions to receive a watermark key associated with the metadata. The program instructions include program instructions to generate a second watermark of the encrypted data using the watermark token and the watermark key and program instructions to compare the second watermark of the encrypted data to the first watermark of the encrypted data. The computer program product beneficially provides the ability to verify the authorized encryption by the storage system prior to writing a block and/or after reading a block. A block that fails verification is not written to storage or, similarly, the read is not returned to the requestor.

The computer program product optionally includes program instruction to send an alert to a user, in response to determining that the second watermark does not match the first watermark. This optional approach provides the ability to alert a user that the data may have been tampered with prior to arriving at the storage system.

A computer-implemented method, according to one approach, includes receiving encrypted data, a watermark token, metadata, and a first watermark of the encrypted data at a storage system, receiving a watermark key associated with the metadata, generating a second watermark of the encrypted data using the watermark token and the watermark key and comparing the second watermark of the encrypted data to the first watermark of the encrypted data. The computer-implemented method beneficially provides the ability to verify the authorized encryption by the storage system prior to writing a block and/or after reading a block. A block that fails verification is not written to storage or, similarly, the read is not returned to the requestor.

A computer program product, according to another approach, includes one or more computer readable storage media, and program instructions collectively stored on the one or more computer readable storage media, the program instructions include program instructions to authenticate an application as authorized to perform encryption and program instructions to receive data at an authenticated encryption layer. The program instructions include program instructions to encrypt the data using an encryption key, wherein the encryption key is not available to the application, and program instructions to generate a watermark token of the encrypted data using a mixing key. The program instructions further include program instructions to generate a watermark of the encrypted data using the watermark token and a watermark key and program instructions to send the encrypted data, the watermark token, and the watermark to a storage system. The storage system is configured to verify the encrypted data for storage using the watermark key. The computer program product provides the ability to detect an alteration to a watermark by an authencrypt verifier using a modification to the watermark processes, e.g., the mixing key.

The computer program product optionally includes wherein the watermark is a keyed-hash message authentication code. This optional approach generate an unforgeable representation, called the watermark token, of the encrypted data, which provides additional security against forgery.

Other aspects and approaches of the present invention will become apparent from the following detailed description, which, when taken in conjunction with the drawings, illustrate by way of example the principles of the invention.

DETAILED DESCRIPTION

Figure 1:
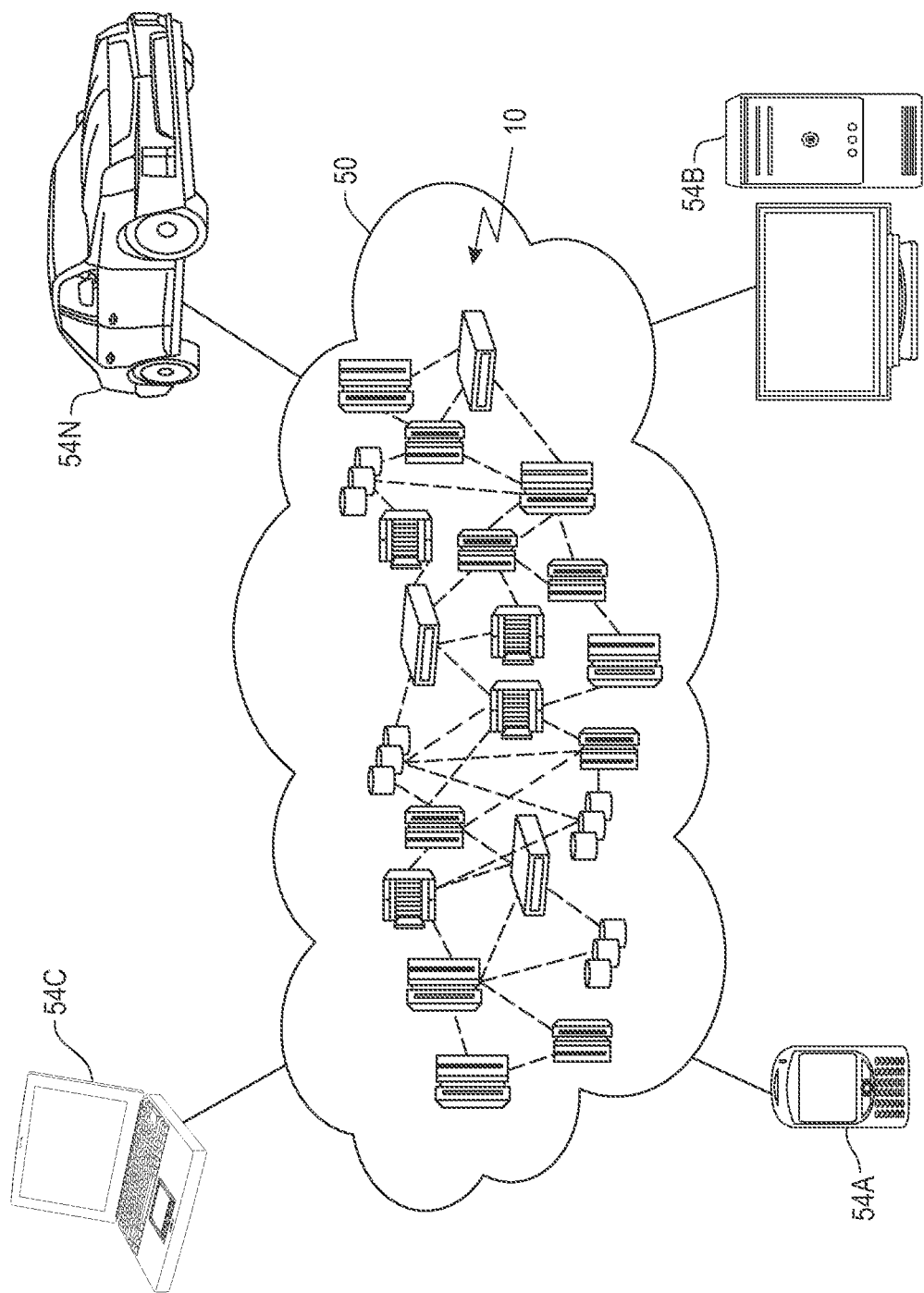
FIG. 1 depicts a cloud computing environment in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several aspects of detecting authorized encryption and blocking storage of data which is encrypted using unauthorized encryption.

In one general aspect, a computer program product includes one or more computer readable storage media, and program instructions collectively stored on the one or more computer readable storage media, the program instructions include program instructions to authenticate an application as authorized to perform encryption and program instructions to receive data at an authenticated encryption layer. The program instructions include program instructions to encrypt the data using an encryption key, wherein the encryption key is not available to the application, and program instructions to generate a watermark token of the encrypted data. The program instructions include program instructions to generate a watermark of the encrypted data using the watermark token and a watermark key and program instructions to send the encrypted data, the watermark token, and the watermark to a storage system. The storage system is configured to verify the encrypted data for storage using the watermark key.

In another general aspect, a computer-implemented method includes authenticating an application as authorized to perform encryption, receiving data at an authenticated encryption layer, encrypting the data using an encryption key, wherein the encryption key is not available to the application, generating a watermark token of the encrypted data, generating a watermark of the encrypted data using the watermark token and a watermark key and sending the encrypted data, the watermark token, and the watermark to a storage system. The storage system is configured to verify the encrypted data for storage using the watermark key.

In another general aspect, a computer program product includes one or more computer readable storage media, and program instructions collectively stored on the one or more computer readable storage media, the program instructions include program instructions to receive encrypted data, a watermark token, metadata, and a first watermark of the encrypted data at a storage system and program instructions to receive a watermark key associated with the metadata. The program instructions include program instructions to generate a second watermark of the encrypted data using the watermark token and the watermark key and program instructions to compare the second watermark of the encrypted data to the first watermark of the encrypted data.

In one general aspect, a computer-implemented method receiving encrypted data, a watermark token, metadata, and a first watermark of the encrypted data at a storage system, receiving a watermark key associated with the metadata, generating a second watermark of the encrypted data using the watermark token and the watermark key and comparing the second watermark of the encrypted data to the first watermark of the encrypted data.

In another general aspect, a computer program product includes one or more computer readable storage media, and program instructions collectively stored on the one or more computer readable storage media, the program instructions include program instructions to authenticate an application as authorized to perform encryption and program instructions to receive data at an authenticated encryption layer. The program instructions include program instructions to encrypt the data using an encryption key, wherein the encryption key is not available to the application, and program instructions to generate a watermark token of the encrypted data using a mixing key. The program instructions further include program instructions to generate a watermark of the encrypted data using the watermark token and a watermark key and program instructions to send the encrypted data, the watermark token, and the watermark to a storage system. The storage system is configured to verify the encrypted data for storage using the watermark key.

It is to be understood that although this disclosure includes a detailed description on cloud computing, implementation of the teachings recited herein are not limited to a cloud computing environment. Rather, aspects of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
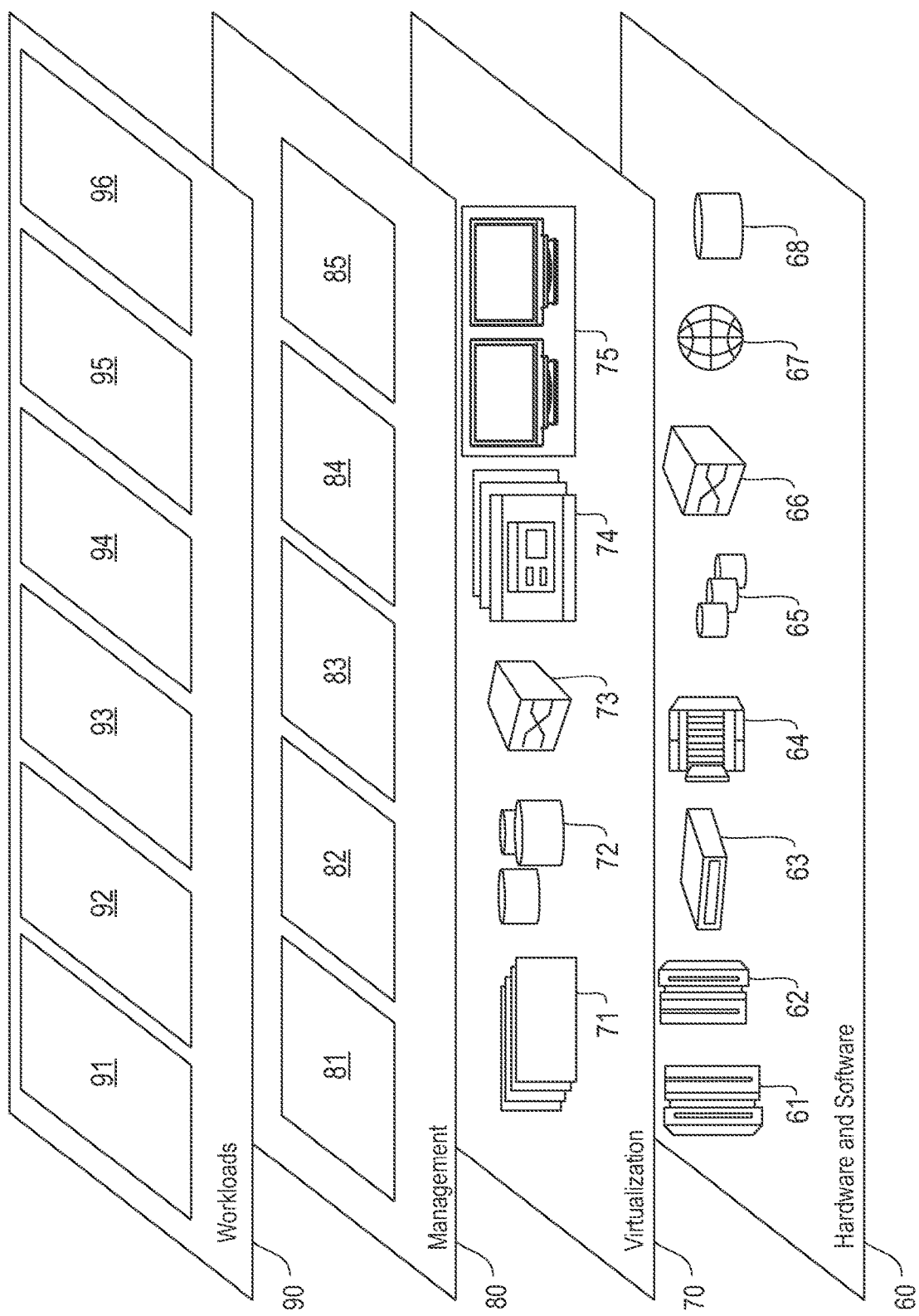
FIG. 2 depicts abstraction model layers in accordance with one aspect of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and aspects of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authencrypt 96.

Unauthorized encryption of data, such as by an attacker encrypting a victim's data with a key unknown to the victim, is a major security issue. Such ransomware attacks create a denial of service for the victim, which can be expensive or impossible to recover from. At least some aspects of the present disclosure provide a method for ensuring that encrypted data in a system has been encrypted in an authorized manner such that the data owner is able to decrypt the data. The encryption is authenticated by the creation of "watermarks" which verify that the encryption was performed by the authorized encryption layer and not an unauthorized process. Ransomware-type attacks are thereby beneficially blocked. Exfiltration-type attacks are highly restricted by requiring data to be encrypted using the authorized encryption by authenticated and/or attested applications which are allowed to use the authorized encryption.

At least some aspects of the present disclosure lock down the user of encryption to prevent data from being stored for which the system does not have a key. Various aspects described herein provide a secure way for the storage system to prevent storing of data that has unauthorized encryption by distinguishing authorized use of encryption from an unauthorized use, without the storage system having access to the encryption key. In various aspects, it is assumed that all communications between disjoint components occur over mutually authenticated secure (e.g., encrypted) sessions. It may also be assumed that all data that is stored in the system is encrypted. A provision for unencrypted data may be included, in at least some approaches, but unencrypted data may be unprotected from exfiltration.

Authenticated encryption (e.g., "authencrypt") uses a key which is known to the system. Registered keys may be stored in a key server and registered keys are only available for authencrypt. Registered keys are unavailable to applications, in preferred aspects. Keys which are not known to the system cannot (e.g., will not) be used by authencrypt. Authencrypt may only be used by authorized applications. In various approaches, a policy manager retains authorization information for the applications in a manner known in the art. For example, a policy may be implemented in an eXtensible Access Control Markup Language (XACML) derivative with associated policy enforcement points, policy decision points, etc. Unauthorized encryption is blocked at storage accordingly. An authorized encryption function may reside at the host and an authencrypt verification function may reside at the storage, in various approaches. In one approach, unauthorized encryption may be blocked prior to storage but the storage preferably also verifies that the encryption is unauthorized.

In one exemplary illustrative aspect, an authencrypt system includes a host with the ability to write to storage. An authorized application attempts to write data to storage and an unauthorized application attempts to write data to storage. The storage system records the data from the authorized application and rejects the data from the unauthorized application, according to at least some aspects described herein. Ransomware is unable to place encrypted data into storage. If the ransomware uses its own encryption key, the data encrypted with the ransomware's encryption key is detected and blocked from being written to storage. Authencrypt obtains all keys from a key server, in one approach, where the key server has the key associated with at least some of the encrypted data in the storage (e.g., there may be a plurality of key associated with different portions of encrypted data in the storage). Plaintext cannot be extracted from storage and only authorized encryption is allowed (e.g., for preventing exfiltration attacks), in preferred aspects.

In preferred aspects, all data written to storage is stored using authorized encryption and plaintext is not stored in storage. Encryption and decryption are preferably limited to authorized applications. Access to encryption keys is limited to the authorized encryption layer. Attempts to write unauthorized encrypted data are detected and blocked at storage (e.g., the unauthorized encrypted data is not stored). Authorizing a new application may require attestation of the application and/or multi-party manual authorization, in a manner known in the art.

In a preferred aspect, protection against unauthorized encryption is delivered using a layered approach. The only encryption permitted for data traversing the system is preferably authorized encryption. All encryption keys for authorized encryption may be accessible by the system owner and such encryption may be distinguished from other encryption without requiring knowledge of the encryption key. This allows for detection of unauthorized encryption without the requirement that the detector have access to the encryption key or the plaintext data. These foregoing features increase system security as the scope of visible keys and plaintext is limited. The authorized encryption function may be encapsulated, such as in hardware, an accelerator, a trusted execution environment, etc., which increases the security for the keys and the encryption process generally.

Figure 3:
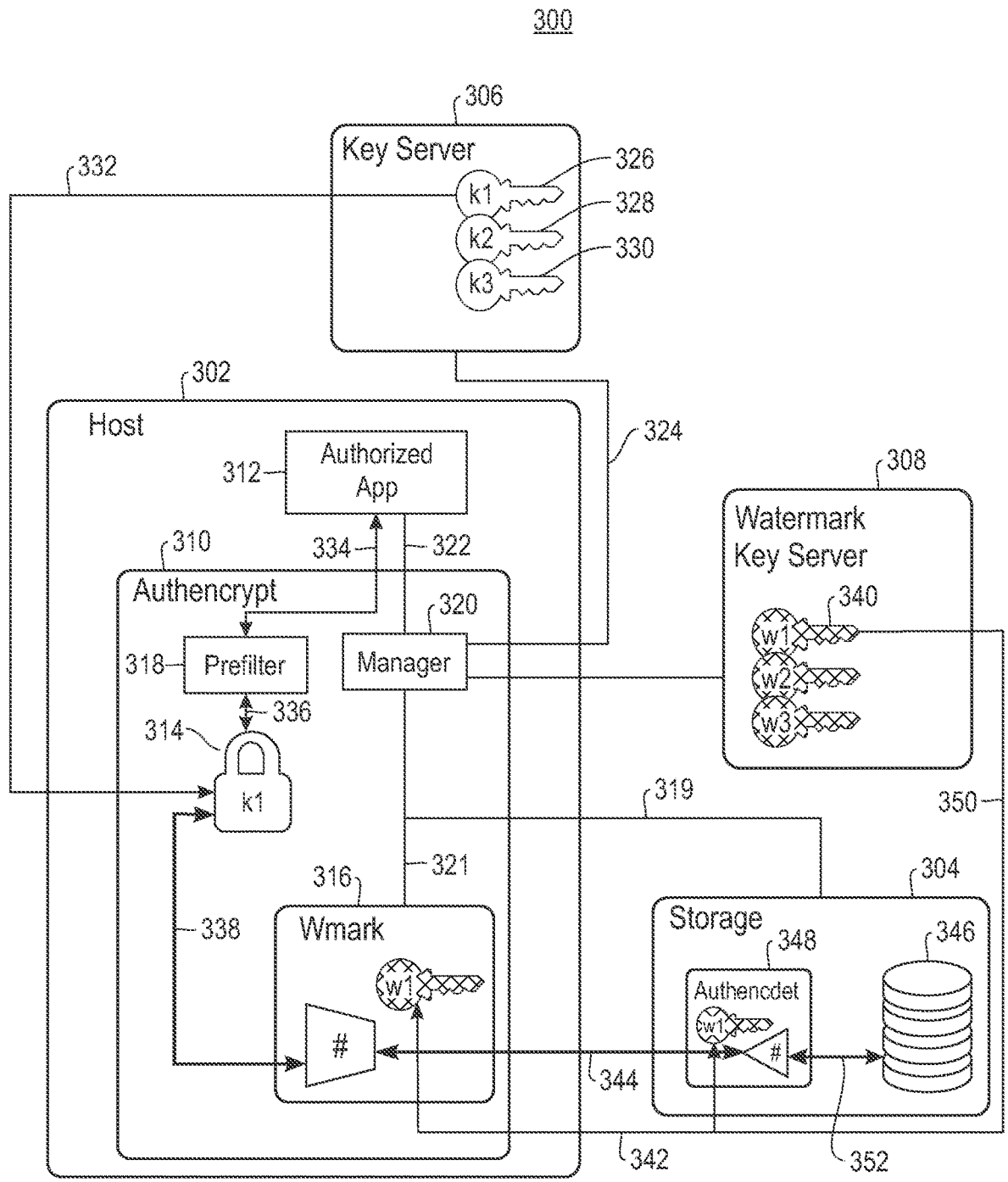
FIG. 3 is a diagram of a high level architecture, in accordance with one aspect of the present invention.

FIG. 3 is a diagram of a high-level architecture, in accordance with various configurations. The architecture 300 may be implemented in accordance with the present invention in any of the environments depicted in FIGS. 1-2 and 4-5, among others, in various configurations. Of course, more or less elements than those specifically described in FIG. 3 may be included in architecture 300, as would be understood by one of skill in the art upon reading the present descriptions.

Architecture 300 illustrates an exemplary data system, according to one aspect. Architecture 300 includes a host system 302 and a storage system 304. The storage system 304 may be any type of storage system known in the art. It should be understood by one having ordinary skill in the art that the storage system 304 may have more or less components than those listed herein. Architecture 300 includes a key server 306 and a watermark key server 308.

The host system 302 comprises an authorized encryption function 310 and an authorized application 312. The authorized encryption function 310 may interchangeably be referred to as "authencrypt" throughout the present disclosure. The authorized encryption function 310 includes an encrypter/decrypter 314, a watermark generator 316, a prefilter 318, and an authencrypt manager 320.

An exemplary operation for encrypting data sent from authorized application 312 is shown according to FIG. 3. In preferred aspects, the authorization of the authorized application 312 is checked and permission to use the authorized encryption function 310 for the authorized application 312 is authenticated prior to sending the data by the authencrypt manager 320. The permissions may be checked in any manner known in the art, with different levels of security, as would become apparent to one having ordinary skill in the art upon reading the present disclosure. In one approach, an allow-list may be used. In another approach, application secure hashes may be checked. In yet another approach, full application attestation with an authority may be performed. If the application fails to obtain encryption permission, the processing of the data is blocked, e.g., the data is not encrypted in via authorized encryption. In at least some approaches, a notification may be logged and/or an alert may be sent to an administrator indicating that an unauthorized application has attempted to access authencrypt.

Once the application is authorized (e.g., authorized application 312), an encryption key is selected for use. An encryption key may be associated with the authorized application 312 in any manner known in the art. In one approach, each system may have a single encryption key which is used for each of the system's authorized applications. In another approach, the encryption key may be a function of the application, the user, the system owner, the data set, a set of files, a set of volumes, etc. Any of the foregoing information may be sent in operation 322 as a request for access by the authorized application 312 to the authencrypt manager 320. The authencrypt manager 320 may generate a new key and/or determine the identity of an encryption key associated with the request. The authencrypt manager 320 sends this information (e.g., a request for a new key or information associated with the identity of an encryption key associated with the request) in operation 324 to the key server 306.

In an alternative approach, the key server 306 performs key generation in response to a request to the key server 306 from the authencrypt manager 320 for generation of a new key.

In preferred aspects, the key server 306 holds the encryption keys authencrypt uses to encrypt the data and associated key identifiers (keyIDs). In preferred approaches, the keyIDs are not easily predictable and/or determinable from the key itself. A random value and/or a value encrypted in a separate key may be used to generate keyIDs. Any other technique for generating the keyIDs may be used. KeyIDs which are not easily predictable and/or determinable from the key itself prevent unauthorized entities from gaining access to the encryption key. For example, malware may be prevented from gaining access to a process authorized for a given client secret data keyID. It is beneficial to make it relatively difficult for the process to use the information to deduce other keyID values, thereby limiting the ability to exfiltrate and/or alter data in other keys. In one preferred aspect, encryption keys stored in the key server 306 are not available to the authorized application 312. In various approaches, the authorized application 312 may have access to the keyID for an encryption key used to encrypt data to/from the authorized application 312. In various aspects, it should become apparent to one having ordinary skill in the art upon reading the present disclosure that having access to the keyID is insufficient to gain access to the data. Specifically, the authencrypt manager 320 performs further checks to determine the application is authorized to utilize the keyID, as described in further detail below.

In at least some approaches, the key server 306 associates keyIDs with the stored encryption keys (e.g., as shown, key k1 326, key k2 328, and key k3 330). As shown in FIG. 3, the authencrypt manager 320 sends the keyID associated with the encryption key (in this case, key k1 326) to the key server 306. The authencrypt manager 320 and/or the key server 306 may store the metadata associated with an encryption key where the metadata describes where the encryption key is used (e.g., what authorized applications are associated with the encryption key). The key server 306 metadata may also include a keyID as a means for referencing a particular encryption key, in a manner known in the art. For security purposes, the information used to identify a key is not configured to allow an observer to derive or guess the key. The authencrypt manager 320 may generate new keys, in some approaches. In preferred approaches, the authencrypt manager 320 is securely isolated from the authorized application 312 in a manner known in the art including via a hardware security module (HSM), a trusted execution environment (TEE), etc.

In preferred aspects, the authencrypt manager 320 grants and/or performs authorization for an application as part of operation 322. The authencrypt manager 320 communicates with the key server 306 to obtain an existing key or a new key based on the request from an application. In response to a request from an already authorized application (e.g., authorized application 312), the authencrypt manager 320 may determine that the application is associated with an existing keyID. The existing keyID and any associated credentials for the application may be passed through the authencrypt manager 320. The authencrypt manager 320 verifies that the application is authorized to access the requested keyID. If the application is authorized, the authencrypt manager 320 may grant permission and instruct the key server 306 to make the key available to the encrypter/decrypter 314 in operation 332. For a new dataset, the authencrypt manager 320 receives the keyID in operation 324 and the authencrypt manager 320 passes the keyID to the watermark key server 308. In preferred approaches, the watermark key server may associate a new watermark with any combination of the data request, with the encryption key, with the keyID, etc., in a manner which would become apparent to one having ordinary skill in the art upon reading the present disclosure.

In a preferred approach, the data request sent to the storage system 304 is associated with the keyID. A watermark verifier uses the keyID to obtain a watermark key utilized for the verification. The watermark verifier may obtain the correct watermark key without interaction with the authencrypt manager 320, in at least some approaches.

In an alternative approach, the authencrypt manager 320 may use the keyID to obtain a watermark key from the watermark key server 308. The authencrypt manager 320 may pass the watermark key to the storage system 304 in operation 319. The authencrypt manager 320 may alternatively pass the watermark key to the watermark generator 316 in operation 321, in various approaches.

The key server 306 securely sends the key k1 326 to the encrypter/decrypter 314 in operation 332. In an alternative aspect, the key server 306 securely sends the key k1 326 to the authencrypt manager 320 and the authencrypt manager 320 sends the key k1 326 to the encrypter/decrypter 314. The encrypter/decrypter 314 may encrypt and/or decrypt using the key k1 326 in a manner known in the art. For example, for symmetric encryption, as shown, the encrypter/decrypter 314 uses the same key for encryption and decryption. If asymmetric encryption is used, the appropriate encryption or decryption key is used, as would be understood by one having ordinary skill in the art upon reading the present disclosure. In a preferred aspect, the authorized encryption function 310 does not accept arbitrary encryption keys as these keys may be malicious. In contrast, the authorized encryption function 310 may require that the system owner has access to a copy of any key used by the authorized encryption function 310, thereby preventing an attacker from using encryption with a key not known to the system (e.g., as in a ransomware attack). The authorized encryption function 310 and the key server 306 may authenticate each other in a manner known in the art to provide additional security against impersonation. Key delivery via operation 332 may also be performed in a secure manner, such as over an encrypted link or using a secure key exchange protocol.

The authorized application 312 may send the data to be encrypted to the authorized encryption function 310 (e.g., the authencrypt layer) in operation 334. In preferred aspects, the data is sent over a secure link, as described above. In various approaches, the optional prefilter 318 receives the data and checks to see if the data is already encrypted, to be described in further detail below. Data that passes the prefilter 318 encryption detection function is sent to the encrypter/decrypter 314 in operation 336. The encrypter/decrypter 314 encrypts the data using the key k1 326 obtained from the key server 306. The encrypted data is sent to the watermark generator 316 in operation 338.

In preferred aspects, the watermark generator 316 may pass the metadata (e.g., the keyID) to the watermark key server 308 such that the correct watermark key may be selected. For example, as shown, the watermark key w1 340 is selected and sent in operation 342 to the watermark generator 316. An associated watermark is computed by the watermark generator 316 using the watermark key w1 340. The encrypted data and the generated watermark are output in operation 344. In various approaches, the authorized encryption function 310 and the watermark key server 308 may authenticate each other for providing security against impersonation. The watermark key server 308 may include metadata associated with a watermark key which describes where the watermark key may be used (e.g., a set of watermark keyIDs, a list of applications, a set of files, a set of volumes, etc.). As shown in FIG. 3, the authencrypt manager 320 sends information to the watermark key server 308 which enables the watermark key server 308 to determine the applicable watermark key. The watermark key server 308 may also maintain a watermark keyID to be used as a reference to an associated watermark key in an analogous manner as the keyIDs may be a reference to the encryption keys from the key server 306. The watermark key delivery as in operation 342 is preferably performed in a secure manner, such as over an encrypted link, a secure key exchange protocol, etc.

In various approaches, the following definitions may be applicable for performing the write operation described herein and as shown in FIG. 3:

Definitions pi=input plaintext i
ci=output ciphertext for pi
txi=watermark token for ci. The watermark token may be used by a verifier to verify that the received parameters are correct, as described below.
k1=data encrypt key (from key server)
w1=watermark key (from watermark key server)
wi=watermark for encrypted data block ci In various approaches, the watermark generator 316 may use any number of methods for creating a value which uniquely identifies the encrypted data (e.g., a watermark for the encrypted data). In a preferred aspect, a keyed-hash message authentication code (HMAC) may be used in a manner which would be understood by one having ordinary skill in the art.

The hash functions may be any form hash, depending on the desired level of security which would be determinable by one having ordinary skill in the art. Exemplary hash functions include MD5, SHA 256, etc. In one approach, a hash function may be used without an HMAC, such as for a SHA3 hash function. In the foregoing approach, a keyed MAC, as defined below, may be used:

$$MAC=hash(key\|ci).$$

The use of a watermark key which is distinct from the encryption key allows for the watermark for the encrypted data to be verified without access to the unencrypted data (e.g., the plaintext data) and/or the encryption key. Access to the watermark key enables storage to verify that the encryption is authorized without access to the encryption key or the plain text. The other features prevent parties from tampering with the encrypted data or the watermark in an undetectable manner. Encrypted data may be detected in a secure manner.

In various aspects, the three basic operations used to create the watermark may be described mathematically as:

$$ci=encrypt(k1,pi)$$

$$txi=MAC(ci)$$

$$wi=HMAC(w1,ci\|txi)$$

After this operation, the authorized encrypted data is prepared to be sent to storage. This may be accomplished with the following operation:

$$\text{send to storage}:\{ci,txi,wi\}$$

The storage system also receives metadata (e.g., from the watermark generator, as described above) which identifies the watermark key associated with this tuple. The watermark generator passes the metadata to the watermark key server so that the appropriate watermark key is selected, in a manner known in the art. For example, if the watermark key is associated with a file, the link between the watermark generator and the storage system is set up such that metadata is associated with the link in the storage controller which contains the metadata associated with the correct watermark key, in various aspects. At the time the link is set up, the watermark key is acquired and saved by the storage system and used on the blocks of data in the request. In an alternative implementation, there may be a separate watermark key for every block of data.

Verification is done by the storage unit prior to writing a block and/or after reading a block. A block that fails verification is not written to storage or, similarly, the read is not returned to the requestor. Operations of at least some aspects of the verification are mathematically described below:

$$receive(ci,txi,wi)$$

get w1 from watermark key server $$wi'=HMAC(w1,ci\|txi)$$

verify $wi==wi'$

In preferred aspects, the storage system does its own independent calculation of the watermark using the ci and the txi which were passed with the watermark. The storage system independently receives the watermark key from the watermark key server, as described above. If ci or txi are not the values that were generated by the watermark generator, the verification fails, as would become apparent to one having ordinary skill in the art upon reading the present disclosure. The verification may fail, for example, if a bad actor tampered with the values (of ci and/or txi) prior to the values reaching the storage. The HMAC provides additional security against forgery of any of these values.

For an authorized application, reading authorized encrypted data is substantially the reverse of the writing operation, as would become apparent to one having ordinary skill in the art upon reading the present disclosure. In a preferred aspect, the storage units verifies the block prior to returning it to the requestor. In one approach, the first verification described below duplicates the verification done in the storage unit. However, if a block fails the first verification, the second verification enables the system to determine where the error was introduced. Note that if the first verification succeeds, txi has be explicitly verified, so the application can proceed to decrypt the data. In some aspects, the system's operation when it receives the block from storage is described mathematically below. In an alternative aspect, only one (the first) of the two verifications is sufficient.

Reading(decryption):

Read $\{ci,txi,wi\}$ from storage get $w1$ from watermark key server $wi'=\text{HMAC}(w1,ci\|txi)$ verify $wi==wi'$ (if verification fails, an error is reported)

$txi'=\text{MAC}(ci)$ verify $txi'=txi$ (if verification fails, an error is reported)

get $k1$ from key server $pi=\text{decrypt}(k1,ci)$

In some approaches, other types of watermarks may include hashing the encrypted data and encrypting the hash with the watermark key, hashing the encrypted data with the watermark key, etc. Asymmetric encryption techniques may be used, including PKI signatures, where a hash of encrypted data is then encrypted in a private key. The public key may be used to verify the signature, as would become apparent to one having ordinary skill in the art upon reading the present disclosure.

One having ordinary skill in the art may modify the various operations described herein for achieving a desired level of security based on the design requirements and the selection of operations used to create the watermark, in a manner which would become apparent upon reading the present disclosure. The watermark provides the ability to check the validity of the encryption without knowing the encryption key. The watermark provides the ability to detect alterations to the watermark and/or the encrypted data while providing resistance to forgery. Performing these operations using symmetric encryption is often preferred due to the higher performance achievable, resistance to quantum attack, smaller key sizes, etc.

Referring back to the write operation as illustrated by FIG. 3, at operation 344, the encrypted data, the watermark token, and the associated watermark represent the authorized encryption of the input data from authorized application 312. When storing the encrypted data, the encrypted data, the watermark token, and the associated watermark are sent securely via operation 344 to the storage system 304. The storage system comprises storage 346 and an authencrypt verifier 348. In preferred aspects, all data transferred into and out of the storage system 304 passes through the authencrypt verifier 348. The authencrypt verifier 348 detects unauthorized encrypted data by determining whether the encrypted data is sent in a manner which bypasses the authorized encryption function 310 (e.g., sent directly to the storage system 304). The authencrypt verifier 348 and its associated functionality may be encapsulated, such as in hardware, an accelerator, in a trusted execution environment, etc., which increases the security for the watermark keys and the watermark generation process.

Prior to storing the data, the authencrypt verifier 348 may obtain the watermark key associated with the data from the watermark key server 308 in operation 350. In various approaches, the authencrypt verifier 348 comprises a watermark generator and comparator. The watermark generator may compute the watermark associated with the received encrypted data (e.g., received via operation 344) and compare the computed watermark with the watermark which was received with the encrypted data. If the watermarks do not match, the encrypted data is not stored. In some approaches, the watermarks must match to a predefined extent. For example, in some approaches, the watermarks must be identical to be considered a "match." In other approaches, a predefined portion, percentage, sub-component, etc., of the watermarks must match. In response to determining that the watermarks do not match, a notification may be logged and/or an alert send to an administrator indicating that an attempt has been made to store unauthorized data, in at least some aspects. If the watermarks match, the encrypted data, watermark token, and the associated watermark are forwarded to storage 346 in operation 352. In preferred aspects, the storage system 304 stores the watermark associated and watermark token with the encrypted data so that the encrypted data may be checked for alteration. The verification may be performed without the authencrypt verifier 348 having access to the plaintext of the key used to create the ciphertext (e.g., the encrypted data). In one approach, if the watermark is generated as an encrypted hash (e.g., as a PKI signature), the detection operation of the authencrypt verifier 348 includes decrypting the watermark using the watermark key and comparing the decrypted watermark with a hash computed on the encrypted data, in a manner which would become apparent to one having ordinary skill in the art upon reading the present disclosure.

The authencrypt verifier 348 may verify that the data is encrypted with authencrypt and not modified at any time, such as on read, during scrub operations (e.g., checking data integrity), etc. Information identifying the encryption key (e.g., the keyID) and/or information identifying the watermark key (e.g., the watermark keyID) may be stored in storage 346, in some approaches, for verifying the data.

Detecting that the input data is encrypted may be performed in a manner known in the art. For example, the data from an authorized application may have a format and/or characteristic which can be determined from the unencrypted data but is missing from the encrypted data. Other techniques for detecting that the input data is encrypted include entropy measurement, statistical tests which are used to assign a probability of a piece of data being encrypted, etc. The system may use a plurality of data chunks, blocks, etc., to increase the accuracy of the detection probability. If the storage system supports continuous data protection, snapshots, or other means to provisionally store data (e.g., supports roll back), the detection may occur after a predetermined number of data pieces have been processed. Events such as snapshots may be triggered by a high probability of encrypted input being detected.

Storage system 304 may include further encryption of the encrypted data and the associated watermark. Additional encryption may be securely implemented to prevent an attacker from using the additional encryption as a means to encrypt data such that the owner of the data is unable to decrypt the data (e.g., access the data in the clear). One secure implementation of additional encryption may include self-encrypting storage units.

The storage system 304 may support the storing of unencrypted data, in some aspects. For storing unencrypted data, the prefilter function (e.g., prefilter 318) may be added to the storage system 304 such that the storage system 304 can distinguish between encrypted data and plaintext data, reject unauthorized encryption, and thereby allow plaintext data to be stored. Allowing the storage of plaintext reduces the security against exfiltration attacks for the plaintext data and may be limited to data of low sensitivity to unauthorized publication, in a manner which would be determinable by one having ordinary skill in the art.

As described above, the encryption keys, the watermark keys, mixing keys (to be described in detail below, see FIG. 4), etc., may be stored in key servers. The key servers may be distributed key servers for additional resiliency. The keys, mixing keys, and/or the watermark keys may be stored in any other manner known in the art. For example, the keys, mixing keys, and/or the watermark keys may be stored in separate storage devices or the same storage device, the keys, the mixing keys, and/or the watermark keys may be generated and/or managed by key managers of a type known in the art, the keys, the mixing keys, and/or the watermark keys may be stored in the host system, the storage system, or any combination thereof, etc. As shown in FIG. 3, the keys and the watermark keys are separately stored to provide isolation. Container-like systems, or TEEs, may be used for isolating the keys, mixing keys, and/or the watermark keys from system administrators, other users without root privileges, etc.

In preferred aspects, the authencrypt manager 320 is incorporated into the authorized encryption function 310. The authencrypt manager 320 may be incorporated in a TEE in the host (e.g., exterior to the authorized encryption function 310), in some approaches. In yet further approaches, the authencrypt manager 320 may be incorporated in the key server 306, the watermark key server 308, a separate secure component such as an HSM or a TEE in another host, etc. In each of these alternative approaches, all the links between the authencrypt manager 320 and other components are secured with authentication, encryption, integrity protection, etc., for security of the data.

Figure 4:
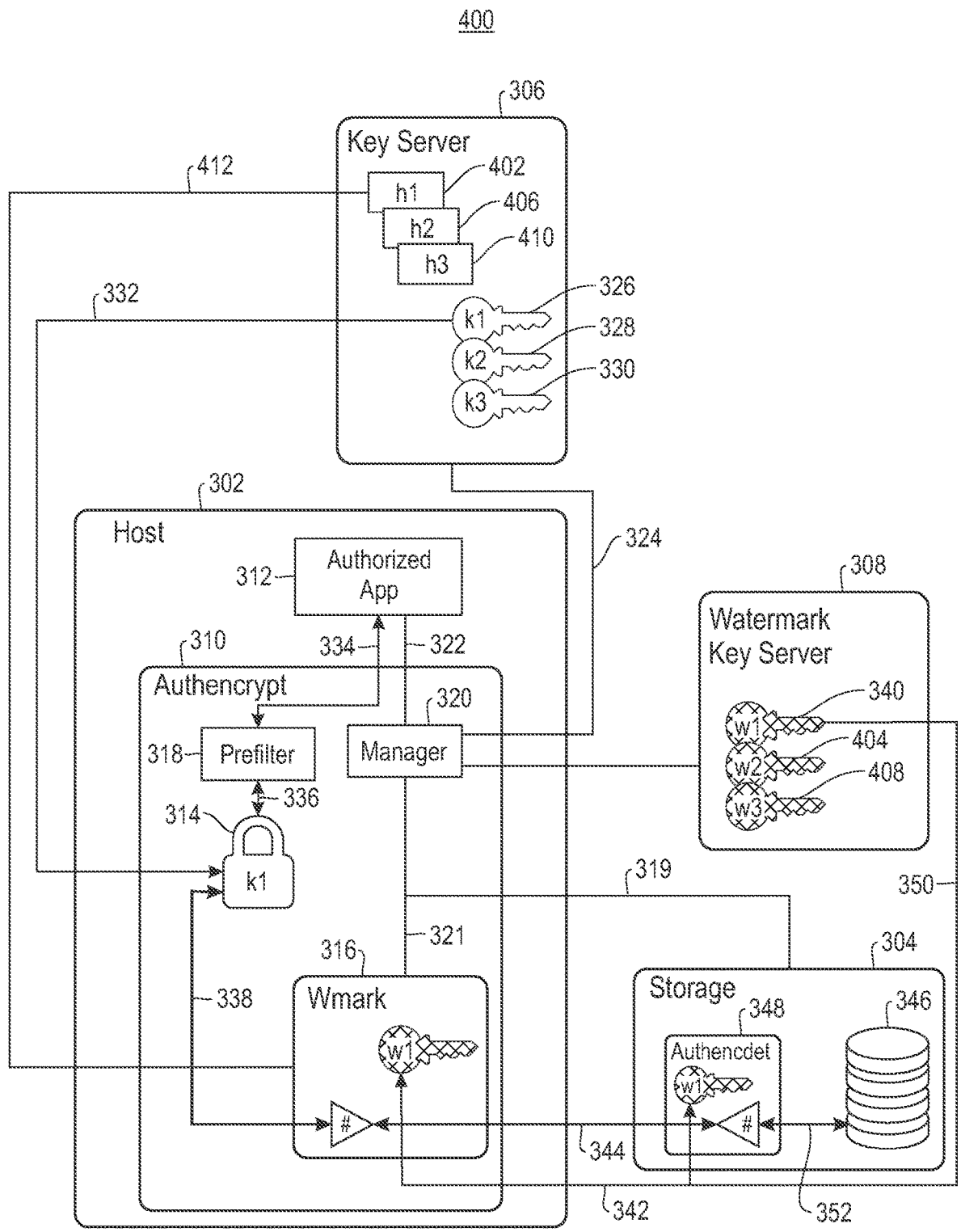
FIG. 4 is a diagram of a high level architecture, in accordance with one aspect of the present invention.

Any form of data may be written and/or read including data blocks, files, objects, any other data format, or any combination thereof. A degree of trust of the authencrypt verifier 348 enables the authencrypt verifier 348 to have access to the ciphertext (e.g., the encrypted data), the watermark, and the watermark key. An authencrypt verifier 348 may alter a block of ciphertext and adjust the watermark. FIG. 4 illustrates how an alteration to a watermark by an authencrypt verifier is detected using a modification to the watermark processes.

FIG. 4 is a diagram of a high-level architecture, in accordance with various configurations. The architecture 400 may be implemented in accordance with the present invention in any of the environments depicted in FIGS. 1-3 and 5-6, among others, in various configurations. Of course, more or less elements than those specifically described in FIG. 4 may be included in architecture 400, as would be understood by one of skill in the art upon reading the present descriptions.

Architecture 400 illustrates an exemplary data system, according to one aspect. FIG. 4 shares common components with FIG. 3 and it should be understood by one having ordinary skill in the art that common features have common numbering and functionality.

Each watermark key is associated with an additional mixing key (e.g., mixing key h1 402, mixing key h2 406, mixing key h3 410, etc.). For example, watermark key w1 340 is associated with additional mixing key h1 402, watermark key w2 404 is associated with additional mixing key h2 406, and watermark key w3 408 is associated with additional mixing key h3 410. In an exemplary implementation, mixing key h1 402 is used to create the watermark token (e.g., which is generated for the encrypted data by the authorized encryption function 310). The mixing key h1 402 is not available to the authencrypt verifier 348. In preferred aspects. The mixing key is encoded into the ciphertext as part of the watermark creation. For example, a plaintext block pi is encrypted using key k1 326 to produce ciphertext block ci, as described below:

$ci=\text{encrypt}(k1, pi)$

A watermark token is created as $txi=\text{HMAC}(h1, ci)$.

In various aspects, the mixing key is used as a key for the first HMAC to generate an unforgeable representation (e.g., a signature), called the watermark token, of the encrypted data. The mixing key h1 402 may be sent in operation 412 to the watermark generator 316, in a manner known in the art. In an alternative approach, the encryption key (e.g., key k1 326) and the mixing key (e.g., mixing key h1 402) are given to the authencrypt manager 320. In this alternative approach, the authencrypt manager 320 gives the encryption key to the encrypter/decrypter 314 and the authencrypt manager 320 gives the mixing key to the watermark generator 316. This unforgeable representation is used in the second HMAC to generate the watermark, wi. The two HMACs are done so that the storage can verify the encryption without having access to the encryption key, k1.

The watermark key w1 340 is obtained from the watermark key server 308, as described above with reference to FIG. 3. The watermark is created as:

$wi=\text{HMAC}(w1, ci\|txi)$.

For storing data, the ciphertext ci, the watermark token txi, metadata, and the watermark wi for plaintext block pi are sent in operation 344 to the storage system 304. The authencrypt verifier 348 obtains the watermark key w1 340 from the watermark key server 308, as described above with reference to FIG. 3. The watermark for ciphertext ci is computed as:

$wi'=\text{HMAC}(w1, co\|txt)$, and compared with wi. Authencrypt verifier 348 does not have sufficient information to alter ci to ci' and create a watermark wi' that matches ci' where the authencrypt verifier 348 does not have access to the mixing key h1 402, according to the implementation shown in FIG. 4 and described herein. If the ciphertext is altered to ci', the watermark is computed as:

$$wi'=\text{HMAC}(w1,ci'\|txi).$$

Without access to h1, a value of txi' that matches ci' is not computed. When the data is verified by the host system 302 on read, it will compute:

$$txi'=\text{HMAC}(h1,ci')\ne txi,$$

$$wi''=\text{HMAC}(w1,ci'\|txi')\ne wi',$$

thus, the alteration is detected.

Other forms of attack include replay attacks, where the contents of previously a written block with authorized encryption are used to replace a different block. The replaced block may be from another location or the replaced block may be a prior copy of a block from the same location. The former type may be detected for example by the use of advanced encryption standard ciphertext stealing (AES-XTS) encryption, where the location is part of the encryption algorithm. The latter may be prevented by the introduction of a sequence number into the watermark and/or the metadata, in some approaches, in a manner which would become apparent to one having ordinary skill in the art upon reading the present disclosure. A sequence number si for plaintext block pi may indicate the number of times the location has been written. The size of the value determines the level of security, in some aspects. For example, an 8-bit value gives 256 unique sequence numbers before wrapping. A larger value, such as 4 bytes, produces over 4 billion unique sequence numbers. The size of the sequence number may be determined by the probability that an attacker may achieve a valid replay value and the maximum number of times a location may be written. The sequence number si may be a simple count, a nonce, a hash of a count, a timestamp, etc. The watermark token generation may be updated accordingly to include si:

$$txi:\text{HMAC}(h1,ci\|si).$$

The sequence number si may be sent in operation 344 to the storage system 304 with the ciphertext (e.g., the encrypted data) where the sequence number si is encrypted such that the sequence number si is not decrypted at the storage system 304. In one exemplary approach, the sequence number si is encrypted in key k1 326, watermark key w1 340, with mixing key h1 402, etc.

Additional metadata may be added to the data and/or the watermark. For example, keyID and/or watermark keyID information may be added to the data and/or the watermark. The watermark keyID may be attached to the watermark, in some approaches, thereby enabling the authencrypt verifier 348 to determine the correct watermark key without external reference. The keyID may be included with the data and verified when the data is decrypted, in one aspect. Data integrity information for the encrypted data may be included including a cyclic redundancy check (CRC), a hash, a message authentication code (MAC), etc., to provide an end-to-end integrity check, in a manner which would become apparent to one having ordinary skill in the art upon reading the present disclosure.

Figure 5:
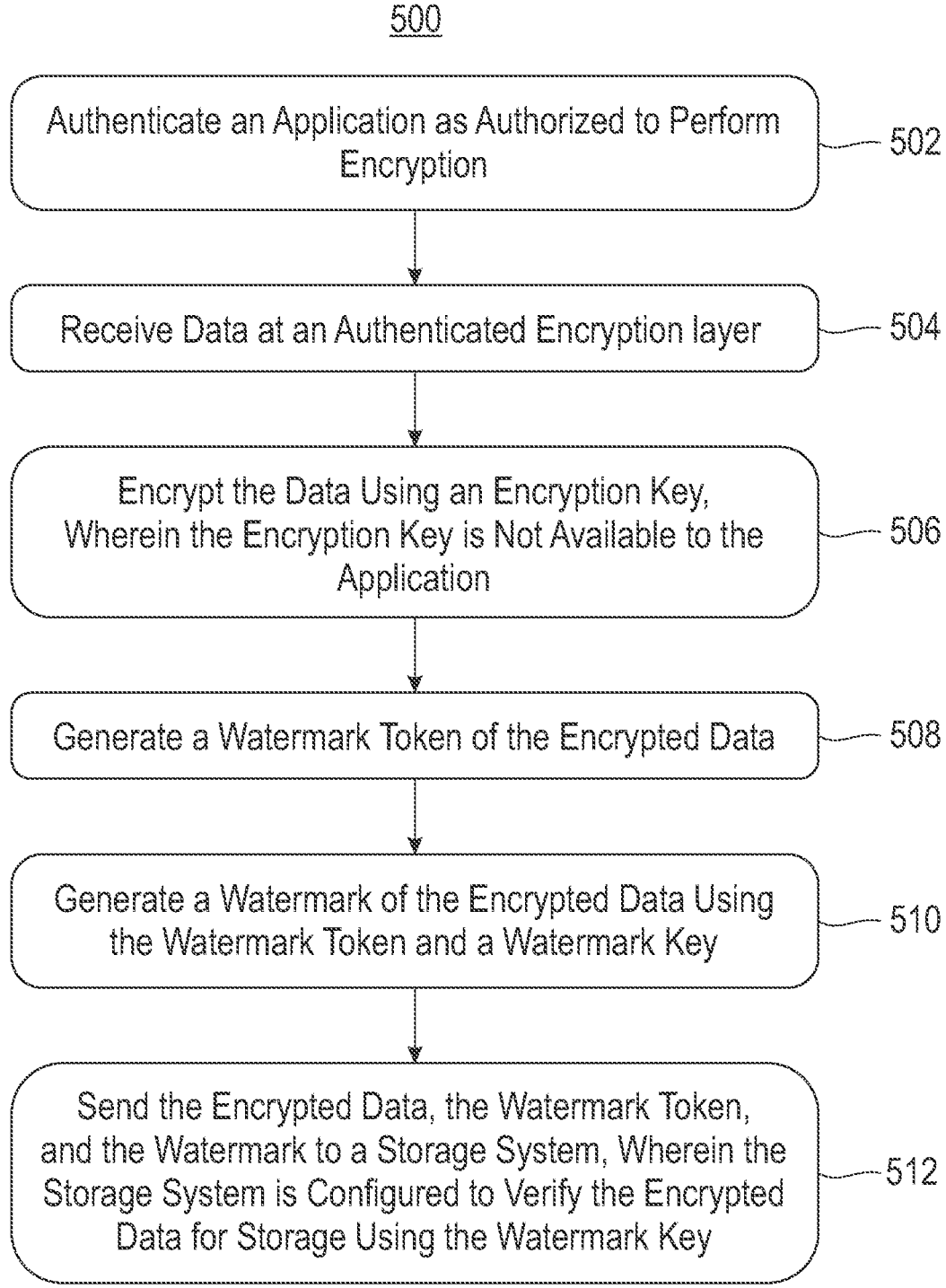
FIG. 5 is a flowchart of a method, in accordance with one aspect of the present invention.

Now referring to FIG. 5, a flowchart of a method 500 is shown according to one aspect. The method 500 may be performed in accordance with the present invention in any of the environments depicted in FIGS. 1-4 and 6, among others, in various aspects. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various aspects, the method 500 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 includes operation 502. Operation 502 includes authenticating an application as authorized to perform encryption. In a preferred aspect an authenticated encryption layer (e.g., an authorized encryption layer) on a host system performs the authentication of the application in a manner known in the art. In various approaches, an application must be authorized to perform encryption and/or store encrypted data in a storage system. A host system, a user, a system, etc., may determine whether an application or a plurality of applications are authorized, prior to the application requesting to read and/or write encrypted data from/to the storage system, in any manner known in the art. In preferred aspects, unencrypted data is not stored in the storage system.

In various aspects, in response to determining that the application is not authorized for encryption, the authenticated encryption layer blocks the read request, the write request, etc., from the unauthorized application. In some aspects, the system may log the incident and/or send an alert to a user of the system to indicate a possible attack from a bad actor. In response to determining that the application is authorized for encryption, the method 500 proceeds to operation 504.

Operation 504 includes receiving data at an authenticated encryption layer. The authorized application may send data to the authenticated encryption layer in a write request, in at least some approaches. The data may comprise any data format known in the art. The data may be in the form of data files, chunks, blocks, etc., or any combination thereof. In various approaches, the data is received at the authenticated encryption layer in any manner known in the art. In preferred aspects, the data is only received in response to determining that the application sending the data is authorized.

In one approach, the authenticated encryption layer includes a prefilter function. In preferred aspects, the prefilter function performs an encryption detection function which includes determining whether the data is pre-encrypted. More specifically, the encryption detection function of the prefilter determines whether the data has been previously encrypted in an encryption key which is not known (e.g., unknown) to the authenticated encryption layer, the storage system, the host system, etc., or any combination thereof. In other aspects, the prefilter encryption detection function determines whether the data is encrypted in any encryption key. In response to determining that the data is encrypted, the authenticated encryption layer may block the data from further processing (e.g., an error may be output, the data may be blocked from further encryption, the write and/or read request is denied, etc.). The error may be logged and/or an alert sent to a user, as described above. Specifically, in response to determining that the data is encrypted, the authenticated encryption layer blocks the encryption of the data. In one exemplary aspect, the authenticated encryption layer may block a write request for encrypted data even if the request is from an authorized application. The authenticated encryption layer preferably only encrypts unencrypted data for authorized applications.

In various aspects, in response to authenticating the application as authorized for encryption, the authenticated encryption layer may request an encryption key and/or a watermark key for the data. In at least some approaches, the encryption key and the watermark key are requested from separate key servers. For example, the encryption key may be requested from a first key server and the watermark key may be requested from a watermark key server. In other aspects, the encryption key and the watermark key are requested from the same key server. The key server(s) may be located on the host system, encapsulated from the host system and/or the storage system, on the storage system, etc. In preferred aspects, the storage system does not have access to the encryption key.

Operation 506 includes encrypting the data using an encryption key. The encryption key may be used to encrypt the data in a manner known in the art. In preferred aspects, the encryption key is not available to the application. The encryption key may be requested by the authenticated encryption layer and sent directly to the authenticated encryption layer in response to the request, preferably bypassing the authorized application.

In various approaches, the authenticated encryption layer requests the encryption key and/or the watermark key based on the credentials of the authorized application. For example, each authorized application may be associated with a single encryption key and a single watermark key. In another example, each authorized application may be associated with set of encryption keys and a set of watermark keys. Any combination of applications, encryption keys, watermark keys, etc., may be used according to at least some of the aspects described throughout the present disclosure.

Operation 508 includes generating a watermark token of the encrypted data. In various approaches, generating a watermark token may include any process of turning the encrypted data into a random string of characters (e.g., a token) that has no meaningful value if breached. Any token as referred to herein may serve as reference to the original data, but the token cannot be used to guess those values (e.g., access the data). In at least some approaches, the watermark token is a message authentication code (MAC) of the encrypted data. In various approaches, the authenticated encryption layer produces metadata associated with the watermark token and/or the watermark key.

In a preferred aspect, generating a watermark token of the encrypted data includes incorporating a mixing key. In some aspects, the mixing key is received at the authenticated encryption layer from the key server which provided the authenticated encryption layer with the encryption key. The mixing key may be encoded into the encrypted data as part of the watermark creation using an HMAC function. For example, the mixing key may be used as a key for an HMAC to generate the watermark token of the encrypted data. In a second HMAC function, the watermark token may be used to generate the watermark (e.g., in an analogous manner to generating the watermark in operation 510 below).

Operation 510 includes generating a watermark of the encrypted data using the watermark token and a watermark key. In various aspects, the watermark of the encrypted data may be generated in any manner known in the art. In one approach, the watermark is keyed-hash message authentication code using the watermark key and the watermark token, in a manner which would become apparent to one having ordinary skill in the art upon reading the present disclosure. In various approaches, if the mixing key is used as a key for a first HMAC to generate the watermark token, the watermark token may be used in a second HMAC to generate the watermark. In these approaches, the two HMACs provide the storage system with the ability to verify the authorized encryption without having access to the encryption key or mixing key. For example, without the mixing key, the storage system is not able to replicate the watermark token and any alteration to the data is detected.

Operation 512 includes sending the encrypted data, the watermark token, and the watermark to a storage system. In some approaches, the storage system may be a sub-system of a computer performing the method, e.g., such as a data storage drive that is part of, and/or is coupled directly to, the computer. In various approaches, the metadata associated with the watermark and/or the watermark key is sent to the storage system. The storage system may request the associated watermark key from the key server based on the metadata, in a manner which would become apparent to one having ordinary skill in the art upon reading the present disclosure. In preferred aspects, the storage system is configured to verify the encrypted data using the watermark key, as described in further detail below with reference to FIG. 6. In response to the storage system verifying the encrypted data, the encrypted data and the watermark of the encrypted data are stored at the storage system in a manner known in the art.

Figure 6:
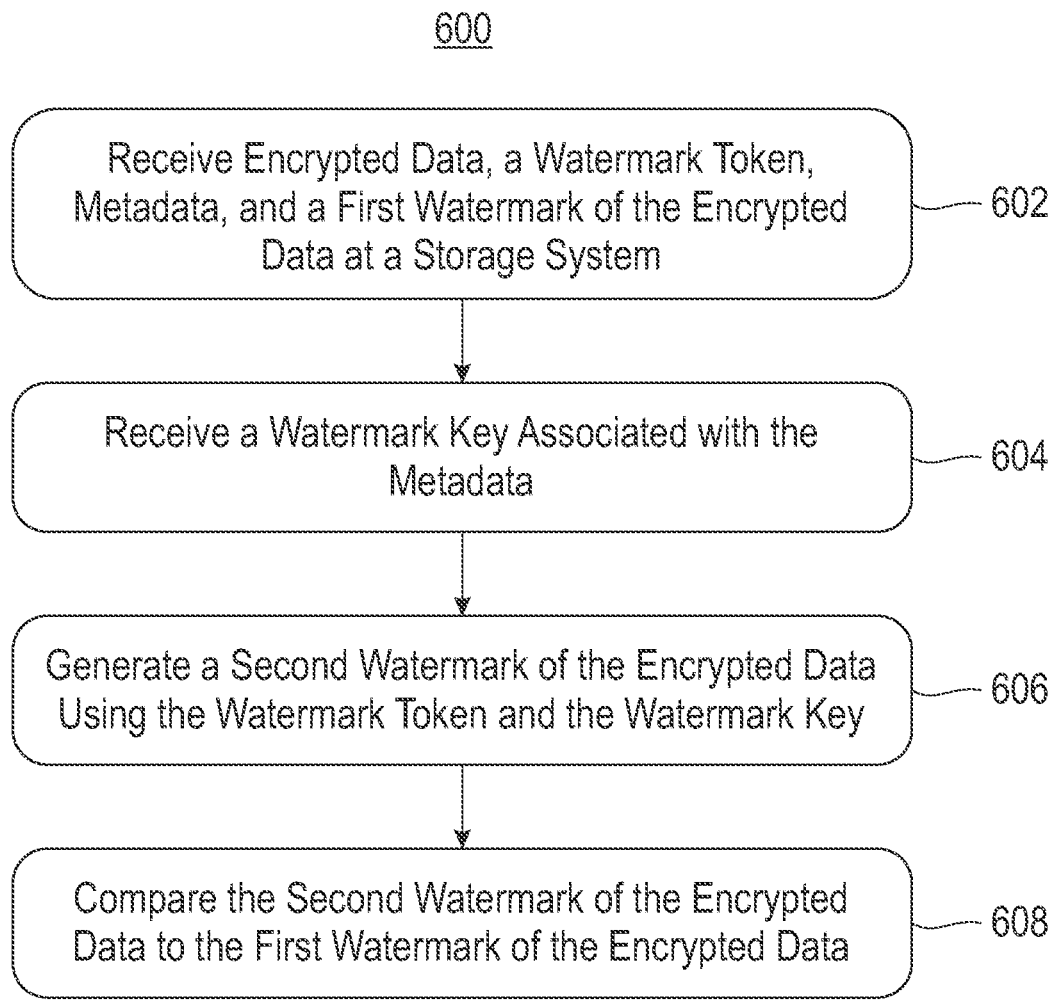
FIG. 6 is a flowchart of a method, in accordance with one aspect of the present invention.

Now referring to FIG. 6, a flowchart of a method 600 is shown according to one aspect. The method 600 may be performed in accordance with the present invention in any of the environments depicted in FIGS. 1-5, among others, in various aspects. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various aspects, the method 600 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 includes operation 602. Operation 602 includes receiving encrypted data, a watermark token, metadata, and a first watermark of the encrypted data at a storage system. The encrypted data may be received from an authenticated encryption layer in a host system. The encrypted data may be part of a write request from an authorized application to write the encrypted data to the storage system. In preferred aspects, the metadata is associated with the first watermark, the watermark token, and/or the watermark key used to generate the first watermark. The watermark token may be of the encrypted data. In preferred aspects, the watermark token is generated as in operation 508 of method 500, as described above with reference to FIG. 5. In further preferred aspects, the watermark is generated as in operation 510 of method 500, as described above with reference to FIG. 5. In yet a further preferred aspect, the storage system does not have access to the encryption key that the encrypted data is encrypted with.

Operation 604 includes receiving a watermark key associated with the metadata. In preferred approaches, the storage system requests the watermark key from a key server based on the metadata received with the encrypted data and the first watermark in a manner which would become apparent to one having ordinary skill in the art upon reading the present disclosure.

Operation 606 includes generating a second watermark of the encrypted data using the watermark key. The watermark of the encrypted data may be generated in a similar manner as described with reference to operation 510 of FIG. 5.

Operation 608 includes comparing the second watermark of the encrypted data to the first watermark of the encrypted data. In preferred aspects, in response to determining that the second watermark matches the first watermark, method 600 includes storing the encrypted data, the watermark token, and the first watermark. In some approaches, the second watermark matches the first watermark to a predefined extent. For example, in some approaches, the watermarks must be identical to be considered a "match." In other approaches, a predefined portion, percentage, sub-component, etc., of the watermarks must match. In various aspects, method 600 includes, in response to determining that the second watermark does not match the first watermark, sending an alert to a user.

In preferred aspects, method 600 includes, in response to determining that the second watermark does not match the first watermark, blocking storage of the encrypted data and the first watermark. In some aspects, blocking storage of the encrypted data and the first watermark may not prevent transient storage of the data pending the verification. For example, the storage system may receive and store the encrypted data in a cache temporarily, pending the verification, as would become apparent to one having ordinary skill in the art upon reading the present disclosure.

The storage system is preferably configured to verify the encrypted data for storage prior writing a block and/or after reading a block. A block that fails verification is not written to storage or, similarly, the read is not returned to the requestor. In various aspects, the storage system does its own independent calculation of the watermark using the encrypted data and the watermark token which are received with the first watermark. If associated values of the encrypted data and/or the watermark token are not the values which were generated by an authenticated encryption layer, the verification fails. In at least some approaches, the storage system performs a second verification of the encrypted data where the storage system independently calculates the watermark token using an MAC of the encrypted data. If the calculated watermark token does not match the watermark token which was received, an error may be reported, the request may be denied, etc.

In preferred approaches which use a mixing key, the storage system does not have access to the mixing key used to generate the watermark token, thereby increasing the security of the system. In other approaches where the storage system has access to the mixing key, the storage system may perform the second verification of the encrypted data by independently calculating the watermark token using an HMAC of the mixing key and the encrypted data, as would become apparent to one having ordinary skill in the art upon reading the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, the computer program product comprising:
    one or more computer readable storage media, and program instructions collectively stored on the one or more computer readable storage media, the program instructions comprising:
    program instructions to authenticate an application as authorized to perform encryption,
    program instructions to receive data at an authenticated encryption layer,
    program instructions to encrypt the data using an encryption key, wherein the encryption key is not available to the application,
    program instructions to generate a watermark token of the encrypted data,
    program instructions to generate a watermark of the encrypted data using the watermark token and a watermark key; and
    program instructions to send the encrypted data, the watermark token, and the watermark to a storage system, wherein the storage system is configured to verify the encrypted data for storage using the watermark key.

2. The computer program product of claim 1, wherein the watermark is a keyed-hash message authentication code.

3. The computer program product of claim 1, comprising:
    program instruction to, in response to authenticating the application as authorized to perform encryption, request the encryption key for the data; and program instruction to request the watermark key for the data.

4. The computer program product of claim 1, comprising:
program instruction to, prior to the encryption, determine, by a prefilter function, whether the data is pre-encrypted in an unknown encryption key; and
program instruction to, in response to determining that the data is pre-encrypted, block the data from encryption using the encryption key.

5. The computer program product of claim 1, comprising:
program instruction to, in response to determining that the application is not authorized to perform encryption, block the data from encryption using the encryption key.

6. A computer program product, the computer program product comprising:
one or more computer readable storage media, and program instructions collectively stored on the one or more computer readable storage media, the program instructions comprising:
program instructions to receive encrypted data, a watermark token, metadata, and a first watermark of the encrypted data at a storage system,
program instructions to receive a watermark key associated with the metadata,
program instructions to generate a second watermark of the encrypted data using the watermark token and the watermark key; and
program instructions to compare the second watermark of the encrypted data to the first watermark of the encrypted data.

7. The computer program product of claim 6, comprising, in response to determining that the second watermark matches the first watermark, storing the encrypted data and the first watermark.

8. The computer program product of claim 6, comprising:
program instruction to, in response to determining that the second watermark does not match the first watermark, blocking storage of the encrypted data and the first watermark.

9. The computer program product of claim 8, comprising:
program instruction to, sending an alert to a user, in response to determining that the second watermark does not match the first watermark.

10. The computer program product of claim 6, wherein the storage system does not have access to an encryption key that the encrypted data is encrypted with.

11. A computer program product, the computer program product comprising:
one or more computer readable storage media, and program instructions collectively stored on the one or more computer readable storage media, the program instructions comprising:
program instructions to authenticate an application as authorized to perform encryption,
program instructions to receive data at an authenticated encryption layer,
program instructions to encrypt the data using an encryption key, wherein the encryption key is not available to the application,
program instructions to generate a watermark token of the encrypted data using a mixing key,
program instructions to generate a watermark of the encrypted data using the watermark token and a watermark key; and
program instructions to send the encrypted data, the watermark token, and the watermark to a storage system, wherein the storage system is configured to verify the encrypted data for storage using the watermark key.

12. The computer program product of claim 11, wherein the watermark is a keyed-hash message authentication code.

13. The computer program product of claim 11, comprising:
program instruction to, in response to authenticating the application as authorized to perform encryption, request the encryption key for the data; and
program instruction to request the watermark key for the data.

14. The computer program product of claim 11, comprising:
program instruction to, prior to the encryption, determine, by a prefilter function, whether the data is pre-encrypted in an unknown encryption key; and
program instruction to, in response to determining that the data is pre-encrypted, block the data from encryption using the encryption key.

15. The computer program product of claim 11, comprising:
program instruction to, in response to determining that the application is not authorized to perform encryption, block the data from encryption using the encryption key.

16. A computer-implemented method, comprising:
authenticating an application as authorized to perform encryption,
receiving data at an authenticated encryption layer,
encrypting the data using an encryption key, wherein the encryption key is not available to the application,
generating a watermark token of the encrypted data,
generating a watermark of the encrypted data using the watermark token and a watermark key; and
sending the encrypted data, the watermark token, and the watermark to a storage system, wherein the storage system is configured to verify the encrypted data for storage using the watermark key.

17. The computer-implemented method of claim 16, wherein the watermark is a keyed-hash message authentication code.

18. The computer-implemented method of claim 16, comprising:
in response to authenticating the application as authorized to perform encryption,
requesting the encryption key for the data; and
requesting the watermark key for the data.

19. The computer-implemented method of claim 16, comprising, prior to the encryption, determining, by a prefilter function, whether the data is pre-encrypted in an unknown encryption key; and
in response to determining that the data is pre-encrypted, blocking the data from encryption using the encryption key.

20. The computer-implemented method of claim 16, comprising, in response to determining that the application is not authorized to perform encryption, blocking the data from encryption using the encryption key.

21. A computer-implemented method, comprising:
receiving encrypted data, a watermark token, metadata, and a first watermark of the encrypted data at a storage system,
receiving a watermark key associated with the metadata,
generating a second watermark of the encrypted data using the watermark token and the watermark key; and
comparing the second watermark of the encrypted data to the first watermark of the encrypted data.

22. The computer-implemented method of claim 21, comprising, in response to determining that the second watermark matches the first watermark, storing the encrypted data and the first watermark.

23. The computer-implemented method of claim 21, comprising: in response to determining that the second watermark does not match the first watermark, blocking storage of the encrypted data and the first watermark.

24. The computer-implemented method of claim 23, comprising: sending an alert to a user, in response to determining that the second watermark does not match the first watermark.

25. The computer-implemented method of claim 22, wherein the storage system does not have access to an encryption key that the encrypted data is encrypted with.

* * * * *